US011586589B2

(12) United States Patent
Scrivano et al.

(10) Patent No.: US 11,586,589 B2
(45) Date of Patent: Feb. 21, 2023

(54) SPEEDUP BUILD CONTAINER DATA ACCESS VIA SYSTEM CALL FILTERING

(71) Applicant: RED HAT, INC., Raleigh, NC (US)

(72) Inventors: Giuseppe Scrivano, Milan (IT); Daniel Walsh, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 88 days.

(21) Appl. No.: 17/038,562

(22) Filed: Sep. 30, 2020

(65) Prior Publication Data

US 2022/0012210 A1 Jan. 13, 2022

Related U.S. Application Data

(60) Provisional application No. 63/051,285, filed on Jul. 13, 2020.

(51) Int. Cl.
*G06F 16/178* (2019.01)
*G06F 9/54* (2006.01)

(52) U.S. Cl.
CPC .............. *G06F 16/178* (2019.01); *G06F 9/54* (2013.01)

(58) Field of Classification Search
None
See application file for complete search history.

(56) References Cited

U.S. PATENT DOCUMENTS

| | | | | |
|---|---|---|---|---|
| 9,836,402 | B1 * | 12/2017 | Riel | G06F 12/084 |
| 10,423,532 | B2 * | 9/2019 | Riel | G06F 12/084 |
| 10,650,138 | B2 | 5/2020 | D'Errico et al. | |
| 11,394,750 | B1 * | 7/2022 | Isberner | H04L 41/22 |
| 2018/0089089 | A1 * | 3/2018 | Riel | G06F 9/45558 |
| 2019/0294779 | A1 | 9/2019 | Suneja et al. | |
| 2020/0193016 | A1 | 6/2020 | Zeng et al. | |
| 2021/0286767 | A1 * | 9/2021 | Colla | G06F 16/168 |
| 2022/0012210 | A1 * | 1/2022 | Scrivano | G06F 16/178 |
| 2022/0179939 | A1 * | 6/2022 | Drepper | G06F 21/629 |
| 2022/0214961 | A1 * | 7/2022 | Masis | G06F 11/3636 |
| 2022/0261366 | A1 * | 8/2022 | Drepper | G06F 13/28 |
| 2022/0276889 | A1 * | 9/2022 | Tsirkin | G06F 9/45545 |

OTHER PUBLICATIONS

Rothberg, V. (Jun. 15, 2020). "Improving Linux Container Security with Seccomp", Red Hat Inc., pp. 7.
Grattafiori, A. (Apr. 10, 2016). "Understanding and Hardening Linux Containers", Technical Director—NCC Group, pp. 122.
Chen, J. (Jun. 6, 2019). "Making Containers More Isolated: An Overview of Sandboxed Container Technologies", Palo Alto Networks, Inc., pp. 14.
Naik, Y. (Aug. 10, 2017). "Hardening Docker Containers, Images, and Host—Security Toolkit", StackRox, Inc., pp. 12.

* cited by examiner

*Primary Examiner* — Kim T Nguyen
(74) *Attorney, Agent, or Firm* — Womble Bond Dickinson (US) LLP

(57) ABSTRACT

A method includes receiving a system call from an application within a container executing on an operating system, the system call comprising a synchronization operation to synchronize memory of the application to storage. The method further includes determining, by the kernel, whether a system call filtering policy associated with the container indicates that the system call is to be prevented. preventing, by the kernel, performance of the synchronization operation in view of the system call filtering policy.

17 Claims, 5 Drawing Sheets

SPEEDUP BUILD CONTAINER DATA ACCESS VIA SYSTEM CALL FILTERING

REFERENCE TO RELATED APPLICATION

This application claims priority to U.S. Provisional Patent Application No. 63/051,285, entitled "SPEEDUP BUILD CONTAINER DATA ACCESS VIA SYSCALLS FILTERING," filed Jul. 13, 2020, which is herein incorporated by reference in its entirety.

TECHNICAL FIELD

Aspects of the present disclosure relate to speedup of build container data access via system call filtering.

BACKGROUND

A file system synchronization operation provides for saving changes to data in memory to a file system of persistent storage. Therefore, the data can be persisted even if system failure occurs, such as power outage. A container may be an isolated execution environment in which one or more applications can execute. The container and the applications of the container can request sync operations to be performed for data of the requesting applications.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
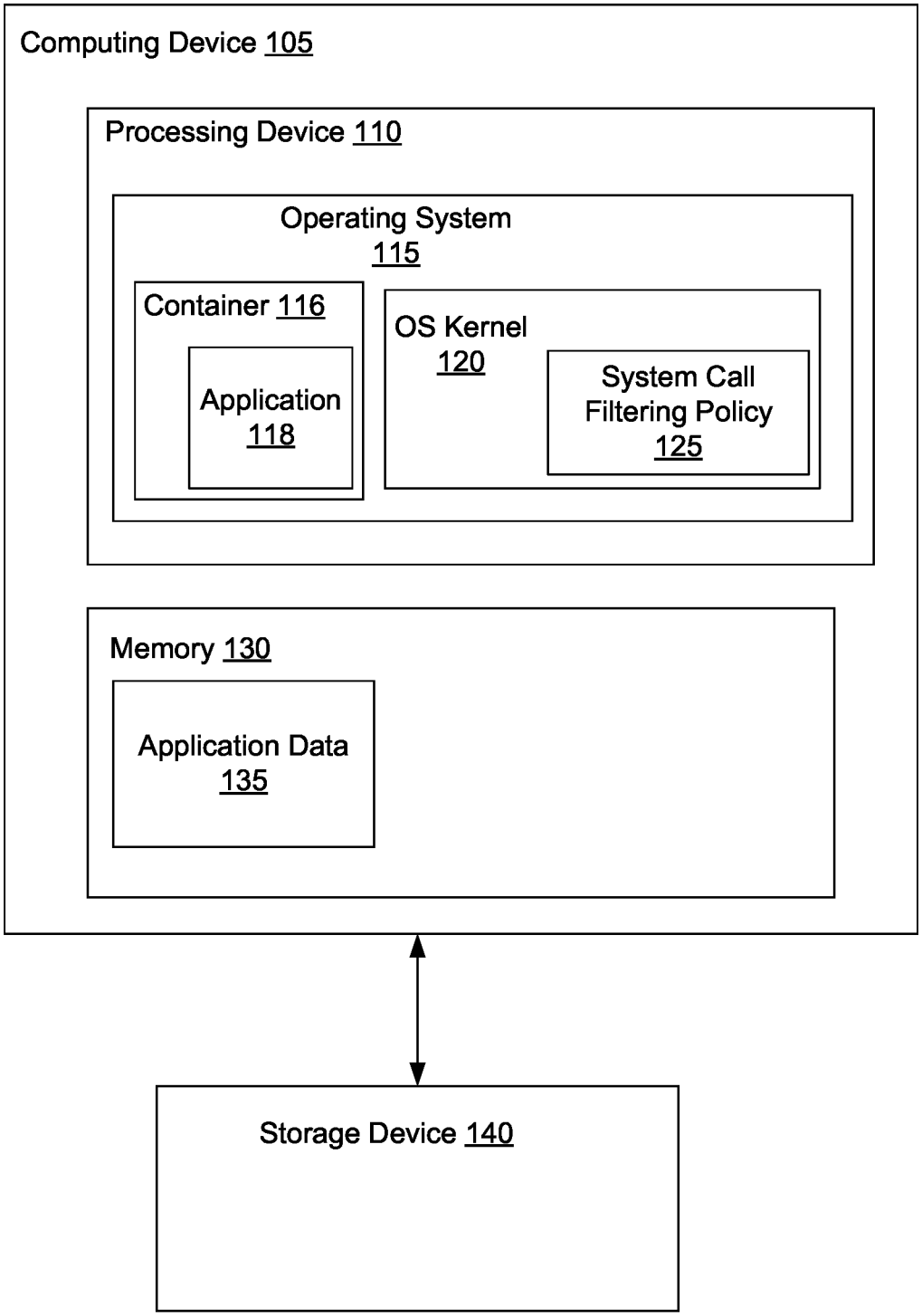
FIG. 1 is a block diagram illustrating an example computer system, in accordance with some embodiments of the present disclosure.

Processes and applications running on a computer system may make writes to data in memory of the computer system. The processes and applications may request an operating system (OS) kernel to save the changes in memory to storage using one of several synchronization (sync) operations. Synchronizing data to storage may be an expensive operation in terms of compute cycles and resource consumption. The OS kernel may freeze other processes to perform the sync operation. In some circumstances, syncing data to storage may not be necessary. Therefore, sync operations performed under these circumstances may utilize resources unnecessarily. For example, during a build of a container image, the changes in memory may be disregarded if the build fails. Thus, sync operations for changes in memory during build of a container image may be excessive since the changes may be disregarded if the build fails or if system failure occurs. Therefore, any additional syncs requested by the container or applications of the container during the build of the container image may result in a significant waste of computer resources.

Aspects of the disclosure address the above-noted and other deficiencies by filtering system calls to prevent syncs of container data to storage. A build of a container image may have two outcomes. First, the container image build may be successful in which case the changes may be synced to storage or written to a different file of storage. Otherwise, the build may fail in which case the build data may be completely disregarded. Thus, there is no need to sync container data while the container image is building. Accordingly, the changes made during the build may be kept in memory for a longer period of time until the OS kernel determines to sync the successful build from memory to storage. In one example, the OS kernel (e.g., a Linux kernel) may include a mechanism for screening and filtering system calls received from a container and may specify how those calls are handled. In one example, the filtering mechanism may be configured to ignore system calls for a sync operation received from a container.

A container orchestration system may initiate a build of a container image and mount several file systems to the container. The container image may include several applications that can each request a large number of sync operations to be performed. Therefore, the kernel may be configured to ignore sync operations received from a container on all file systems that are mounted up by the container while the container is running. The OS kernel may indicate to the requesting application that sync operations are performed although the sync operations may not be performed. Therefore, applications may operate normally as if the sync operations had been performed without reprogramming any of the applications of the container. Sync operations for the container and applications of the container may then be dealt with by the OS kernel outside of the code of the applications of the container.

Advantages of the present disclosure include faster container build and better performance of a computer system performing container builds due to fewer interruptions and reduced computer resource utilization from sync operations. Additionally, aspects of the present disclosure reduce the number of sync operations to storage and, accordingly, number of writes to storage. Reducing the number of writes may be significant because some systems may support only a limited number of writes to storage.

FIG. 1 illustrates an example of a computer system 100 for performing filtering of system calls from a container, in accordance with one or more aspects of the present disclosure. Computer system 100 may include a computing device 105 coupled to a storage device 140. In one example, computer system 100 may be a cloud computing platform. Computing device 105 may be any data processing device, such as a desktop computer, a laptop computer, a mainframe computer, a personal digital assistant, a rack-mount server, a hand-held device or any other device configured to process data. Although depicted separately, storage device 140 may be included within computing device 105 or coupled to the computing device 105 through a network or any other communication link. Storage device 140 may be local or remote persistent storage such as a hard-disk drive, flash storage, a solid state drive, or any other type of persistent data storage.

Computing device 105 may include processing device 110 and memory 130. Processing device 110 may be a system on a chip, a processing core, a central processing unit (CPU), graphics processing unit (GPU), microprocessor or any other device with processing capabilities. Memory 130 may be volatile or non-volatile memory such as random access memory (RAM), dynamic random access memory (DRAM), static random access memory (SRAM), flash memory, or any other type of memory used by a computer system.

Processing device 110 may include an operating system 115. Operating system 115 may be software to provide an interface between the computing hardware (e.g., processing device 110) and applications running on operating system 115. Operating system 115 may include an OS kernel 120 and a user space in which one or more containers 116 may execute. Container 116 may include an application 118. Application 118 may be a desktop application, a network application, a database application, or any other application that may execute within a container. Container 116 may be a virtualized execution environment providing limited access to computer system resources (e.g., as a sandbox application). In one example, container 116 may be a container in the process of being built or a transient container to be disregarded after operation. Operating system kernel 120 may include several operating system functionalities, including but not limited to, applying a system call filtering policy 125. System call filtering policy 125 may be a secure computing mode policy (e.g., of a Linux operating system) associated with container 116. The system call filtering policy 125 may be configured to handle system calls in several different ways. For example, the system call filtering policy 125 may be configured to filter particular system calls received from container 116. In one example, the system call filtering policy 125 may filter system calls associated with syncing in-memory data of container 116 (e.g., container build data 135) to storage (e.g., storage device 140).

In one example, the OS kernel 120 may filter all system calls associated with syncing data to storage that are received from a process of container 116 during a build of the container 116. During a build of the container 116, a container orchestration system may initialize the build from a container image. The container image may include the applications 118 included within the container and the resources to be allocated for operation of the container. Building the container 116 may include instantiating virtualized resources for the container and installing the applications from the container image. During this process of the building the container, the OS kernel 120 may filter, using the system call filtering policy 125, any sync operations received from the container 116. The operating system kernel 120 may prevent the execution of the sync operation system call and then return an indication to the container that the sync operation system call was successful. Therefore, the container, and the application that made the sync operation system call, may operate as normal as though the sync operations had been performed.

Figure 2:
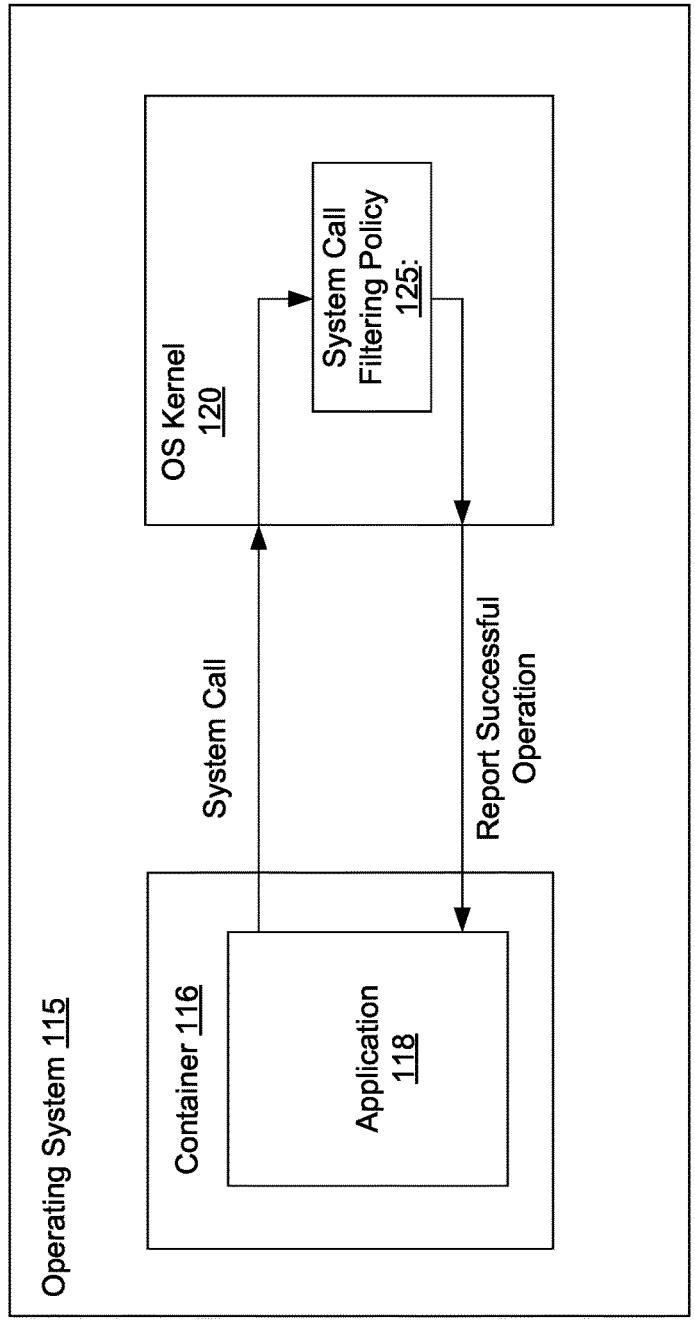
FIG. 2 is a block diagram illustrating an example system for filtering system calls to speedup build container data access, in accordance with some embodiments of the present disclosure.

FIG. 2 is a block diagram illustrating a computer system 200 for filtering system calls received from a container. Computer system 200 may include an operating system 115 comprised of an OS kernel 120. Operating system 115 run a container 116 (e.g., within a user space of the operating system 115) and an application 118 within the container 118. Operating system 115, container 116, application 118, OS kernel 120, and system call filtering policy 125 may be the same or similar to operating system 115, container 116, application 118, OS kernel 120, and system call filtering policy 125, respectively, as described with respect to FIG. 1.

In one example, system call filtering policy 125 may be associated with container 116 to prevent performance of sync operations received from container 116 and any applications executing within the container 116 (e.g., application 118). Application 118 may send a system call to OS kernel 120 to perform a sync operation to save changes in application data associated with application 118 to persistent storage. The OS kernel 120 may receive the system call and determine whether the system call filtering policy 125 associated with container 116 indicates that the system call is to be prevented. If the OS kernel 120 determines that the system call filtering policy 125 indicates that the sync operation is to be prevented, the OS kernel 120 may prevent the sync operation and report to the application 118 that the sync operation was successful. The application 118 may pause execution until the sync operation is reported as successful. Therefore, the OS kernel 120 may report the sync operation as successful although the sync operation was prevented.

In one example, the system call may be any type of system call to be performed by the OS kernel 120. System call filtering policy 125 of the operating system kernel 120 may include a secure computing mode policy to filter out particular system calls, such as sync, fsync, fdatasync, msync, sync_file_range, syncfs, or any other memory to storage sync operation. In particular, the secure compute mode policy may cause the operating system kernel 120 to block any system call that has been designated by the secure compute mode policy to be filtered.

In one example, the OS kernel 120 may apply the system call filtering policy 125 during a build of the container 116. Once the build of the container 116 completes successfully, the OS kernel 120 may perform a sync operation to persist the data for the completed build. The OS kernel 120 may perform the sync operation on its own without receiving a system call from the container 116. In one example, the OS kernel 120 may, automatically and without a system call, perform a sync operation intermittently. In another example, the OS kernel 120 may perform a sync operation in response to receiving an indication that the build of container 116 completed successfully.

Figure 3:
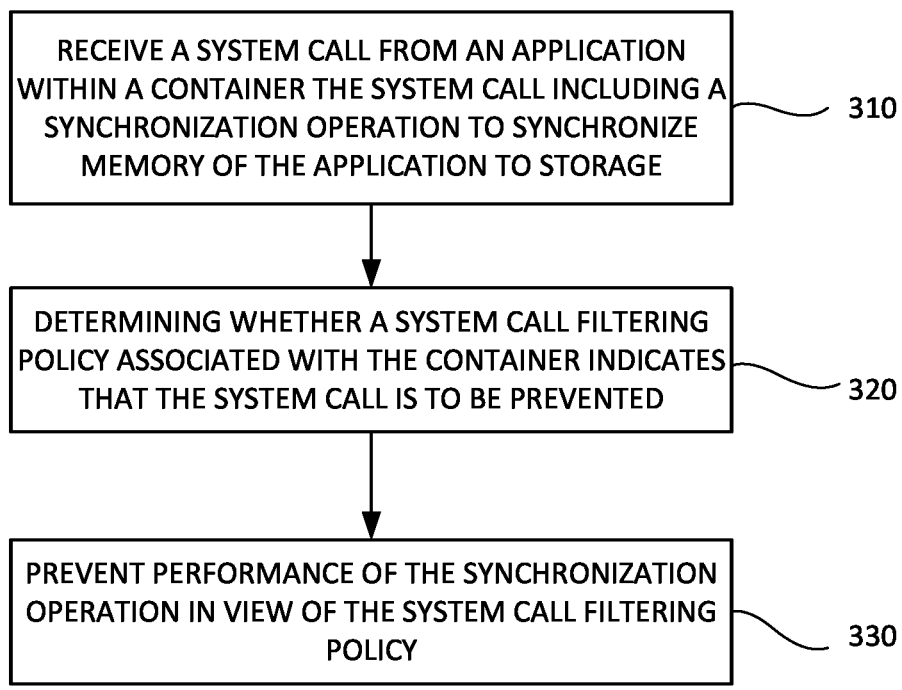
FIG. 3 is a flow diagram illustrating an example method for filtering system calls to speedup build container data access, in accordance with some embodiments of the present disclosure.

FIG. 3 is a flow diagram of a method 300 of filtering system calls from a container, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by an operating system kernel 120 using a system call filtering policy 125.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives, at a kernel of an operating system, a system call from an application within a container executing on the operating system. The system call may include a synchronization operation to synchronize memory of the application to persistent storage. The operation to synchronize memory to persistent storage may include any sync operation, such as the Linux native system calls of sync, fsync, fdatasync, msync, sync_file_range, syncfs, or any other memory to storage sync operation on any operating system. Each sync operation may cause the OS kernel to perform a unique operation to sync data from memory to persistent storage.

At block 320, processing logic determines whether a system call filtering policy associated with the container indicates that the system call is to be prevented. The system call filtering policy may be a secure compute mode policy of the operating system kernel for filtering system calls. In particular, the secure compute mode policy may be defined to filter any system calls for syncing memory to storage that are received from a container during build of the container. In one example, the system call filtering policy may filter all sync operations or a subset of all possible sync operations. In another example, the processing logic may filter system calls from a transient container for which data in memory may be disregarded after the transient container ceases operation, or after completion of a process of the container. To determine whether the system call filtering policy indicates that the system call is to be prevented the processing logic may identify the system call filtering policy associated with the container, determine at least one system call to be filtered by the system call filtering policy, and determine whether the at least one system call to be filtered includes the system call.

At block 330, processing logic prevents performance of the operation to sync memory of the application to storage. In one example, the processing logic only prevents sync operations received from the container. Internal sync operations of a file system may still be performed. At block 340, processing logic transmits a response to the application indicating that the system call was performed. The response indicating that the system call was performed may indicate that a sync operation was successfully performed even though the operating system kernel prevented performance of the sync operation. Therefore, the processes in the container may operate normally as though the system call sync operations are being performed without the need to reprogram the container processes. The operating system kernel may sync container data outside of the program code of the application. In one example, the OS kernel may sync the container data after successful build of the container.

Figure 4:
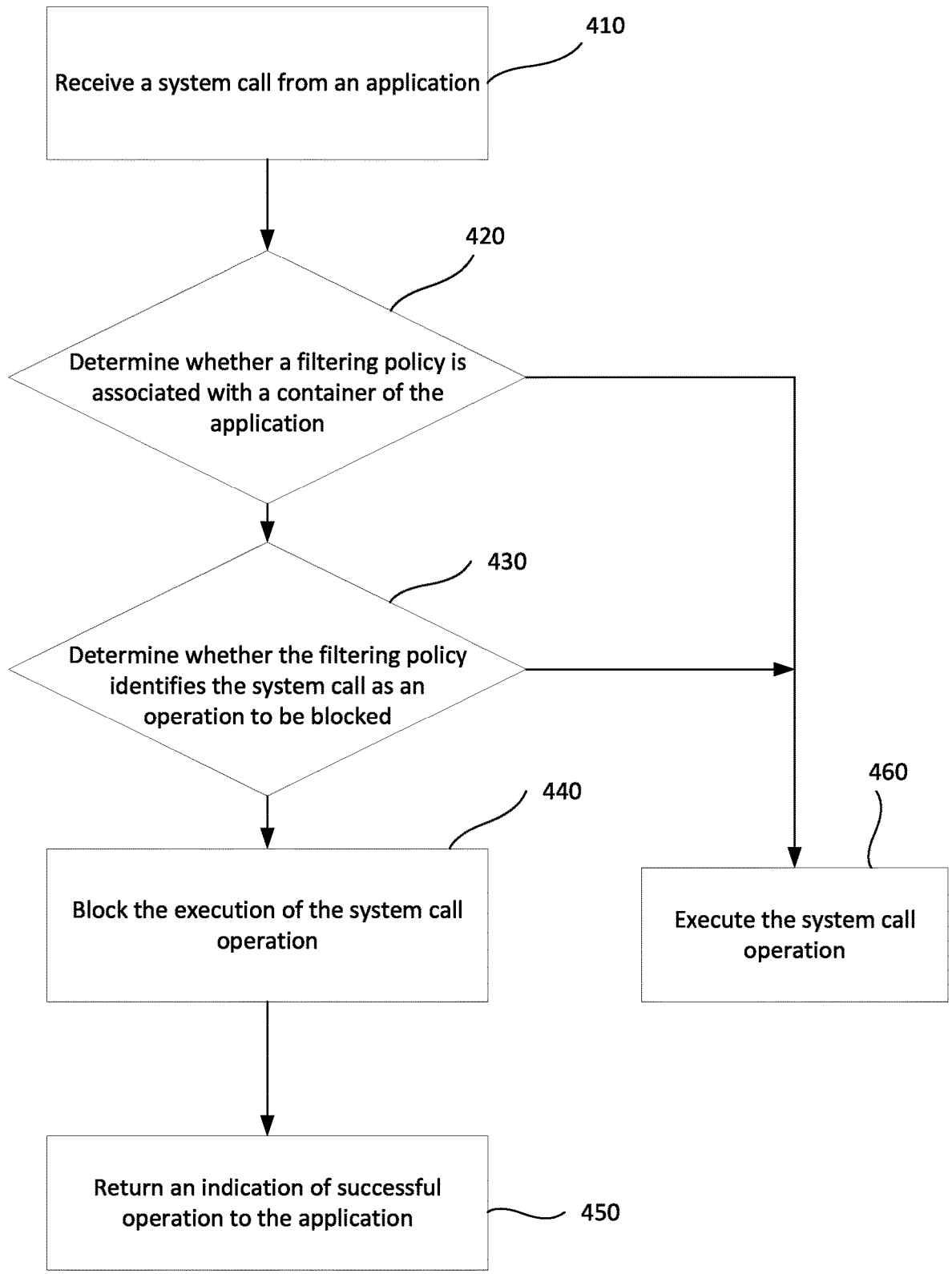
FIG. 4 is a flow diagram illustrating another example method for filtering system calls to speedup build container data access, in accordance with some embodiments of the present disclosure.

FIG. 4 is a flow diagram of a method 400 of filtering system calls from a container, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by an operating system kernel 120 using a system call filtering policy 125.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a system call from an application of a container. The system call may be a sync operation to save application data from memory to storage. In one example, the sync operation may be received during a build of the container. In another example, the container may be a transient container. Applications within the container may provide system calls to perform sync operations associated data of the container and applications within the container. For example, as the container is being built, applications of the container may send system calls to the kernel in attempt to sync changes to application data to memory.

At block 420, the processing logic determines whether a system call filtering policy is associated with the container from which the system call is received. The processing logic may also determine whether the container is in the process of being built and whether the application from which the system call is received is executing within the container. In another example, the processing logic may determine whether the container is a transient container. Otherwise, if a system call filtering policy is not associated with the container, the process continues to block 460, where the system call is performed.

At block 430, if a system call filtering policy is associated with the container, the processing logic determines whether the system call filtering policy identifies the system call as an operation to be blocked. The filtering policy may be a secure compute mode policy defined to filter sync operations received from a container or from applications within the container. In one example, the system call filtering policy may block performance of any sync operations received from the container and from applications executing within the container. In another example, the system call filtering policy may block performance of a subset of all possible sync operations from the container.

At block 440, in response to determining that the system call filtering policy identifies the system call as an operation to be blocked, the processing logic may block the execution of the system call operation. Thus, the processing logic may ignore system call operations for syncing application data to persistent storage in view of the system call filtering policy. At block 450, the processing logic may return an indication of successful operation of the system call to the application. Therefore, the application may proceed to execute as though the system call had been performed, even though execution of the system call was blocked.

Figure 5:
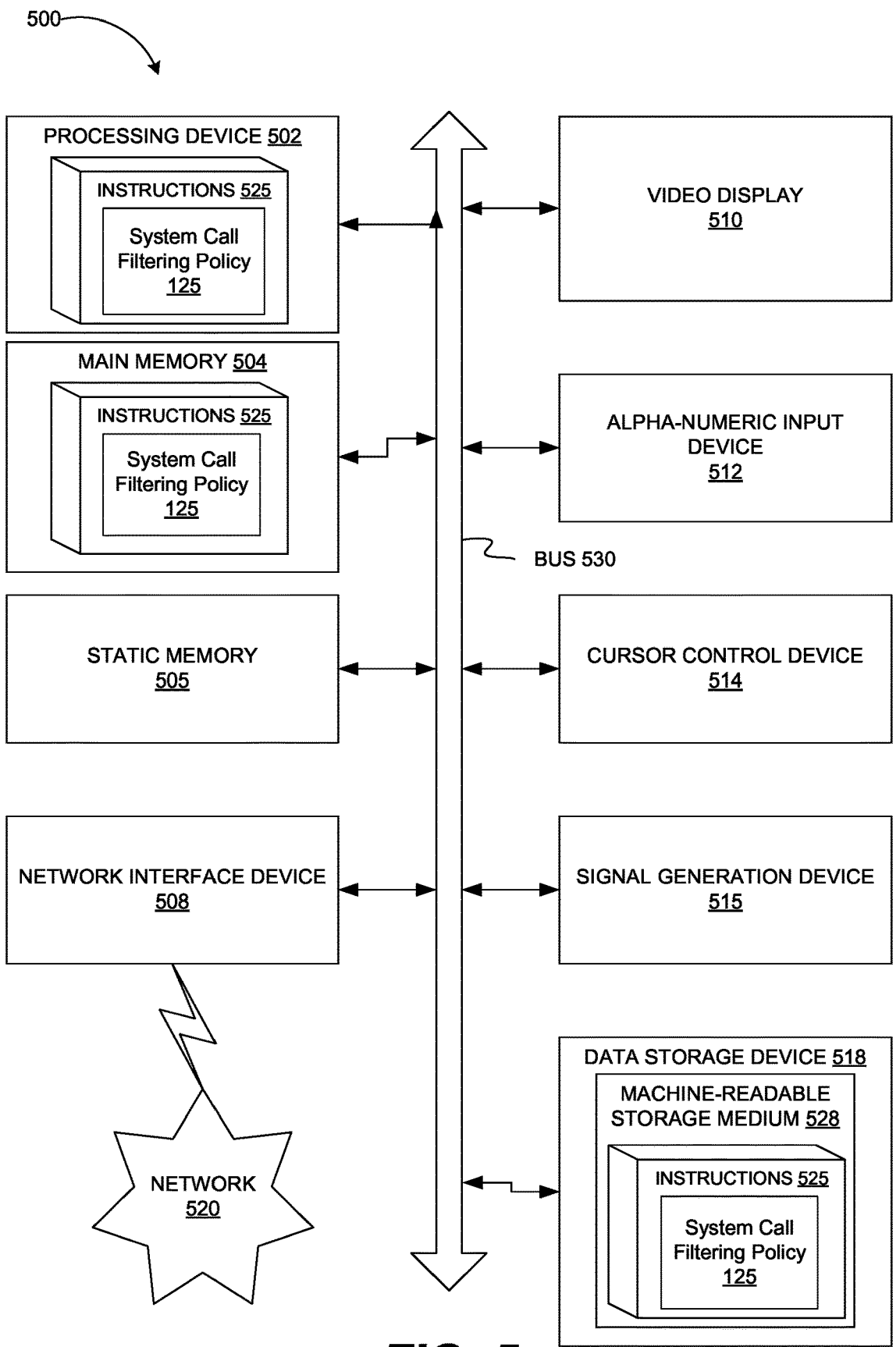
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a system call from an application within a container executing on an operating system, the system call comprising a synchronization operation to synchronize memory of the application to storage;
   determining, by processing device executing an operating system kernel, whether a system call filtering policy associated with the container indicates that the system call is to be prevented; and
   preventing, by the processing device executing the kernel, performance of the synchronization operation in view of the system call filtering policy, wherein the system call filtering policy comprises a secure computing mode policy to prevent performance of system calls received from the container that are associated with synchronizing data in memory to storage.

2. The method of claim 1, further comprising:
   providing a response to the application indicating that the system call has been performed.

3. The method of claim 2, wherein the response provided to the application indicating that the system call has been performed comprises an indication that the synchronization operation has been successfully performed.

4. The method of claim 1, wherein determining whether the system call filtering policy indicates that the system call is to be prevented comprises:
   identifying the system call filtering policy associated with the container;
   determining at least one system call to be filtered by the system call filtering policy; and
   determining whether the at least one system call to be filtered includes the system call received from the application.

5. The method of claim 1, wherein the system call filtering policy associated with the container prevents performance of synchronization operations received from the container during a build of the container.

6. The method of claim 5, further comprising:
   determining that the build of the container has completed; and
   synchronizing the completed build of the container to storage.

7. A system comprising:
   a memory; and
   a processing device operatively coupled to the memory, the processing device to:
   receive, at a kernel of an operating system executing on the processing device, a system call from an application within a container executing on the operating system, the system call comprising a synchronization operation to synchronize memory of the application to storage;
   determining, by the kernel, whether a system call filtering policy associated with the container indicates that the system call is to be prevented; and
   preventing performance of the synchronization operation in view of the system call filtering policy, wherein the system call filtering policy comprises a secure computing mode policy to prevent performance of system calls received from the container that are associated with synchronizing data in memory to storage.

8. The system of claim 7, wherein the processing device is further to:
   provide a response to the application indicating that the system call has been performed.

9. The system of claim 8, wherein the response provided to the application indicating that the system call has been performed comprises an indication that the synchronization operation has been successfully performed.

10. The system of claim 7, wherein to determine whether the system call filtering policy indicates that the system call is to be prevented, the processing device is to:
    identify the system call filtering policy associated with the container;
    determine at least one system call to be filtered by the system call filtering policy; and
    determine whether the at least one system call to be filtered includes the system call received from the application.

11. The system of claim 7, wherein the system call filtering policy associated with the container prevents performance of synchronization operations received from the container during a build of the container.

12. The system of claim 11, wherein the processing device is further to:
    determine that the build of the container has completed; and
    synchronize the completed build of the container to storage.

13. A non-transitory computer-readable storage medium including instructions that, when executed by a processing device, cause the processing device to:
    receive a system call from an application within a container executing on an operating system, the system call comprising a synchronization operation to synchronize memory of the application to storage;

determining, by the processing device executing an operating system kernel, whether a system call filtering policy associated with the container indicates that the system call is to be prevented; and preventing, by the processing device, performance of the synchronization operation in view of the system call filtering policy, wherein the system call filtering policy comprises a secure computing mode policy to prevent performance of system calls received from the container that are associated with synchronizing data in memory to storage.

14. The non-transitory computer-readable storage medium of claim 13, wherein the processing device is further to:

provide a response to the application indicating that the system call has been performed.

15. The non-transitory computer-readable storage medium of claim 13, wherein to determine whether the system call filtering policy indicates that the system call is to be prevented, the processing device is to:

identify the system call filtering policy associated with the container;

determine at least one system call to be filtered by the system call filtering policy; and determine whether the at least one system call to be filtered includes the system call received from the application.

16. The non-transitory computer-readable storage medium of claim 13, wherein the system call filtering policy associated with the container prevents performance of synchronization operations received from the container during a build of the container.

17. The non-transitory computer-readable storage medium of claim 16, wherein the processing device is further to:

determine that the build of the container has completed; and synchronize the completed build of the container to storage.

* * * * *